Sept. 3, 1935.  D. B. KNIGHT  2,013,469
EVAPORATOR
Filed Nov. 25, 1930
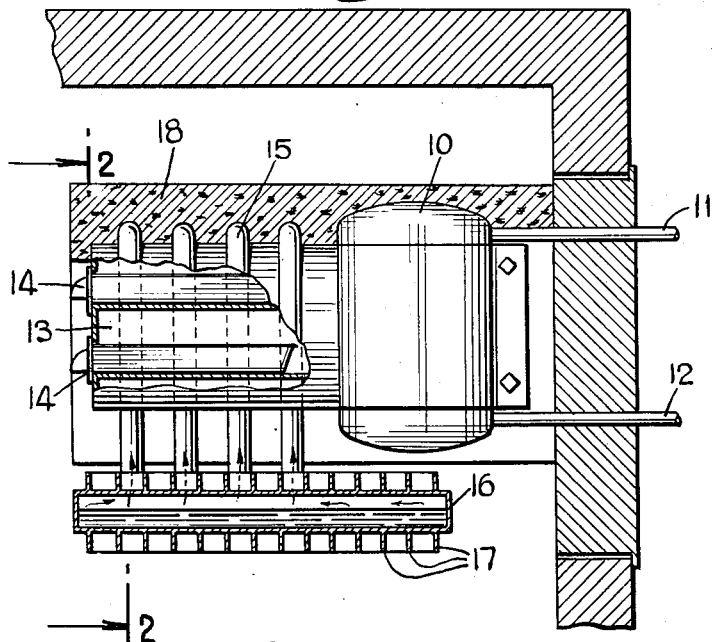
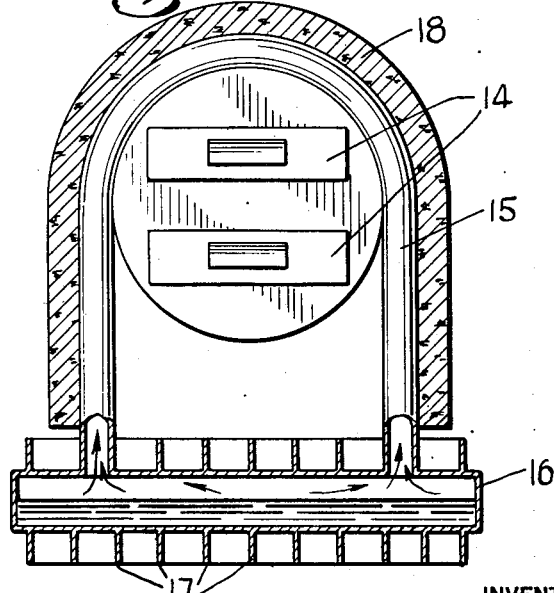
INVENTOR
D. B. Knight
BY
ATTORNEY Patented Sept. 3, 1935

2,013,469

UNITED STATES PATENT OFFICE 2,013,469

EVAPORATOR

Donald B. Knight, Brooklyn, N. Y., assignor to Electrolux Servel Corporation, New York, N. Y., a corporation of Delaware Application November 25, 1930, Serial No. 497,992

12 Claims. (Cl. 62—91.5)

This invention relates to refrigeration and more specifically to an evaporator by which two different temperatures may be maintained in a refrigerator.

An object of this invention is to provide in a refrigerator an evaporator in which there is a low temperature region for freezing purposes and a higher temperature region for cooling the refrigerating chamber.

Another object of this invention is to provide an evaporator which will maintain a refrigerating chamber at the desired temperature for preserving comestibles and provide a low temperature region for freezing purposes which evaporator will not become frosted.

Further objects and advantages will be apparent from the following description taken in connection with the accompanying drawing wherein Fig. 1 is a vertical section of an evaporator contemplated by this invention, and Fig. 2 a sectional view on line 2—2 in Fig. 1.

A solution of ammonia in water has a higher boiling point than liquid ammonia under the same conditions of pressure. If a solution of ammonia and water is boiled and the ammonia vapor which passes off during the boiling is condensed, it is found that the ammonia condenses at a much lower temperature than that at which the solution is boiling. This invention contemplates the application of this principle to obtain different refrigerating temperatures in a refrigerator.

Referring to Fig. 1, an evaporator 10 of any desired construction having a refrigerant inlet line 11 and a vapor outlet line 12 for connection in a refrigerating system has a chamber 13 which is adapted to receive trays 14 for containing water or some other substance to be frozen. Chamber 13 is maintained at a temperature, usually around 20° F., low enough to freeze the substance contained in the trays.

A plurality of substantially U-shaped tubes 15 are suspended from and in good thermal contact with evaporator 10 with their open ends downward. The lower ends of these tubes are connected to communicate with the interior of a closed vessel 16 which is provided with heat radiating fins 17. A solution of ammonia and water is contained in the vessel 16 which constitutes the higher temperature part of the evaporator.

Heat from the refrigerating chamber is transferred through the fins 17 and the vessel 16 to the solution of ammonia and water which is of such a concentration that it will boil at any desired temperature, for instance, around 30° F., at the minimum pressure which depends upon the cooling effect of the low temperature element. The ammonia vapor which results from this boiling passes upwardly from the vessel 16 into the tubes 15. Since tubes 15 are in good thermal transfer relation with the evaporator 10 which is maintained at a low temperature as mentioned above, the ammonia vapor in the coils 15 condenses to a liquid which drains back into the vessel 16 where it is again dissolved and the cycle again repeated.

A jacket 18 of heat insulating material is placed over the evaporator 10 completely enclosing the latter except for the front end where an opening is provided through which the trays 14 are accessible. Since the evaporator 10 which is maintained at a low temperature for freezing the substance in the trays 14 is heat insulated by the jacket 18, and the vessel 16 is maintained at a temperature at which frost will not form thereon, the necessity of defrosting is eliminated and two temperatures are obtained, a higher temperature, for instance around 30° F., in the vessel 16 which has an extensive surface formed by the fins 17 for effectively cooling the refrigerating chamber, and a low freezing temperature, for instance around 20° F., in compartment 13 which contains the trays 14.

Any number of solutions other than ammonia in water mentioned for the purposes of this description may be used if desired and this device is not limited to use with any particular type of refrigerating machine or system.

It will be obvious to those skilled in the art that various other changes may be made in the construction and arrangement without departing from the spirit of the invention and therefore the invention is not limited to what is shown in the drawing and described in the specification but only as indicated in the appended claims.

I claim:

1. In combination, an evaporator adapted to receive trays for holding material to be frozen, a vessel enclosing a fluid tight chamber, a plurality of conduits each communicating at both ends with said chamber, and each having a portion thereof in thermal exchange relation with said evaporator, a heat insulating jacket around said evaporator, and having an opening therein to afford access to said trays, and a solution of refrigerant gas in a solvent therefor in said vessel.

2. In combination, an evaporator having a chamber adapted to receive material to be frozen, a heat insulating jacket around said evaporator, said jacket having an opening therein affording access to said chamber, a fluid tight vessel having heat transfer fins, a plurality of U-shaped conduits communicating at each end with the interior of said vessel, a portion of each conduit being in heat exchange relation with said evaporator, and a water solution of ammonia in said vessel.

3. A refrigerating element comprising an evaporator enclosing a chamber, a plurality of trays removably supported within said chamber, a fluid tight vessel having a heat radiating surface and suspended from said evaporator by a plurality of inverted U-shaped conduits, each conduit communicating at both ends with the interior of said vessel and having its curved portion in thermal exchange relation with said evaporator, a heat insulating jacket around said evaporator, said jacket having an aperture therein affording access to said trays, and a water solution of ammonia contained in said vessel.

4. A refrigerating element comprising an evaporator adapted to be connected in a refrigerating system, said evaporator enclosing a chamber adapted to receive material to be frozen, a heat insulating jacket around said evaporator and having an aperture therein affording access to said chamber, a fluid tight vessel below said evaporator, conduits communicating at each end thereof with the interior of said vessel, each conduit having a portion thereof in thermal exchange relation with said evaporator, and a solution of refrigerant gas in a solvent therefor in said vessel.

5. A refrigerating element comprising an evaporator adapted to be connected to a refrigerating machine for maintaining said evaporator at a low temperature, a heat insulating jacket around said evaporator, a fluid tight conduit having a portion thereof in thermal exchange relation with said evaporator, and a water solution of ammonia in another portion of said conduit below said evaporator.

6. The method of inhibiting frost formation in the food space of a domestic refrigerator which includes absorbing heat into a solution of fluids having markedly spaced boiling point values to drive from solution a markedly greater proportion of one fluid than the other, condensing the vapor above the solution at a temperature below 32° F., and insulating the condensing section to prevent formation of frost thereon, the difference in boiling points of the solution fluids and the temperature in the condensing space being such that frost formation is substantially prevented in heat exchange relation with the solution liquid.

7. The method of producing refrigeration which includes absorbing heat from a space to be cooled into a solution of fluids having markedly spaced boiling point values to drive from solution a markedly greater proportion of one fluid than the other, condensing the vapor above the solution liquid at a temperature below 32° F. without freezing any of said solution fluids, insulating the condensing space to prevent formation of frost thereon, freezing ice in heat exchange relation with the condensing section, the difference in boiling points of the solution fluids and the temperature in the condensing space being such that frost formation is substantially prevented in heat exchange relation with the solution liquid.

8. The method of inhibiting frost formation in the food space of a domestic refrigerator which includes absorbing heat from the food space into a solution of ammonia in water, condensing the vapor above the solution at a temperature somewhat below 32° F., and insulating the space where condensation takes place but not where the solution receives heat from the food space.

9. The combination in a refrigerator with the evaporator of a refrigerating system, of a hermetically sealed heat transfer unit including a condensing section in heat transfer relation with said evaporator and a vaporization section in heat transfer relation with a space to be cooled, said heat transfer unit containing a solution of fluids of markedly spaced boiling point values.

10. The combination in a refrigerator with the evaporator of a refrigerating system, of a hermetically sealed heat transfer unit including a condensing section in heat transfer relation with said evaporator, means to hold water to be frozen in heat exchange relation with said evaporator, said heat transfer unit including a vaporization section in heat transfer relation with a space to be cooled and containing a solution of fluids of markedly spaced boiling point values.

11. The combination in a refrigerator having a food space with an evaporator of a refrigerating system situated in said food space, of a hermetically sealed heat transfer unit including a condensing section in heat transfer relation with said evaporator, and a vaporization space in direct heat transfer relation with said food space, said evaporator and condensing section being insulated from the food space, and said heat transfer unit containing a solution of fluids of markedly spaced boiling point values.

12. The combination in a refrigerator having a food space with an evaporator of a refrigerating system situated in said food space, of a hermetically sealed heat transfer unit including a condensing section in heat transfer relation with said evaporator, and a vaporization space in direct heat transfer relation with said food space, said evaporator and condensing section being insulated from the food space, and said heat transfer unit containing ammonia and water.

DONALD B. KNIGHT.